(12) United States Patent
Foth et al.

(10) Patent No.: US 11,722,324 B2
(45) Date of Patent: Aug. 8, 2023

(54) SECURE AND ACCOUNTABLE EXECUTION OF ROBOTIC PROCESS AUTOMATION

(71) Applicant: PricewaterhouseCoopers LLP, New York, NY (US)

(72) Inventors: Thomas Joseph Foth, Melrose, MA (US); Francis Njoroge Kahura, Pembroke Pines, FL (US); Ernesto Valdes Forte, Arlington, VA (US)

(73) Assignee: PricewaterhouseCoopers LLP, New York, NY (US)

( * ) Notice: Subject to any disclaimer, the term of this patent is extended or adjusted under 35 U.S.C. 154(b) by 479 days.

(21) Appl. No.: 16/815,626

(22) Filed: Mar. 11, 2020

(65) Prior Publication Data
US 2021/0288823 A1 Sep. 16, 2021

(51) Int. Cl.
*H04L 9/32* (2006.01)
*H04L 9/06* (2006.01)
*H04W 12/06* (2021.01)
*G06F 21/51* (2013.01)
*H04L 9/00* (2022.01)

(52) U.S. Cl.
CPC ............ *H04L 9/3297* (2013.01); *G06F 21/51* (2013.01); *H04L 9/0637* (2013.01); *H04L 9/3236* (2013.01); *H04L 9/3239* (2013.01); *H04W 12/06* (2013.01); *H04L 9/50* (2022.05)

(58) Field of Classification Search
CPC .......... G06F 21/44; G06F 21/50; G06F 21/51; G06F 21/57; G06F 21/64; G06F 21/645; G06F 2221/033; G06F 2221/0737; H04L 9/0643; H04L 9/3239; H04L 9/50
See application file for complete search history.

(56) References Cited

U.S. PATENT DOCUMENTS

2018/0190283 A1* 7/2018 Xun .................... G10L 15/22
2019/0188712 A1* 6/2019 Fedorov ................ H04L 9/3239
2019/0303579 A1 10/2019 Reddy et al.
2019/0305957 A1* 10/2019 Reddy .................. H04L 63/123
(Continued)

FOREIGN PATENT DOCUMENTS

EP 3499847 A1 6/2019
WO 2018/058441 A1 4/2018

OTHER PUBLICATIONS

International Search Report and Written Opinion dated Jun. 1, 2021, directed to International Application No. PCT/US2021/019034; 13 pages.

*Primary Examiner* — Eric W Shepperd
(74) *Attorney, Agent, or Firm* — Morrison & Foerster LLP

(57) ABSTRACT

Systems and methods for secure and accountable execution of computer scripts are disclosed. A system for validating an execution of a set of computer instructions may be configured to receive a first cryptographic hash, the first cryptographic hash corresponding to the set of computer instructions, to receive a second cryptographic hash, the second cryptographic hash corresponding to a runtime utility, wherein the runtime utility is configured to execute the set of computer instructions, to generate a ledger entry comprising the first cryptographic hash, the second cryptographic hash, and an indicator of success, and to add the ledger entry to a blockchain ledger, wherein the blockchain ledger is configured to receive the ledger entry from an authenticated node.

26 Claims, 6 Drawing Sheets

(56) References Cited

U.S. PATENT DOCUMENTS

| | | | |
|---|---|---|---|
| 2020/0036519 A1* | 1/2020 | Bitauld | H04L 9/3263 |
| 2020/0076613 A1* | 3/2020 | Ciscato | G06Q 20/3678 |
| 2021/0081546 A1* | 3/2021 | Falk | H04W 12/128 |
| 2021/0200560 A1* | 7/2021 | Munteanu | G06N 5/025 |
| 2021/0216306 A1* | 7/2021 | Moeller | G05B 19/058 |
| 2021/0256113 A1* | 8/2021 | Stott | G06F 21/64 |
| 2021/0357508 A1* | 11/2021 | Elovici | G06F 11/3684 |

\* cited by examiner

100

102
EXECUTING A COMPUTER SCRIPT USING A RUNTIME UTILITY

104
PRODUCING A LOG FILE AS A RESULT OF EXECUTING THE COMPUTER SCRIPT

106
GENERATING A PLURALITY OF HASH VALUES CORRESPONDING TO THE COMPUTER SCRIPT, RUNTIME UTILITY, AND LOG FILE

108
GENERATING A PLURALITY OF LOCATION TRACKERS CORRESPONDING TO THE COMPUTER SCRIPT, RUNTIME UTILITY, AND LOG FILE

110
GENERATING A DATA PACKAGE COMPRISING THE PLURALITY OF HASH VALUES AND THE PLURALITY OF LOCATION TRACKERS

112
REGISTERING A BLOCK CORRESPONDING TO THE PACKAGE TO A BLOCKCHAIN LEDGER

113A
EXTRACTING FROM THE LOG FILE DATA CORRESPONDING TO ONE OR MORE DEPENDENT PROGRAMS USED IN EXECUTING THE COMPUTER SCRIPT

113B
GENERATING A PLURALITY OF HASH VALUES AND/OR LOCATION TRACKERS CORRESPONDING TO THE ONE OR MORE DEPENDENT PROGRAMS

113C
EXTRACTING FROM THE LOG FILE DATA CORRESPONDING TO A RESULT OF SCRIPT EXECUTION

114
DISTRIBUTING THE TRACKED FILES IN ACCORDANCE WITH THE PLURALITY OF LOCATION TRACKERS

116
DISTRIBUTING THE BLOCKCHAIN LEDGER

FIG. 1

SECURE AND ACCOUNTABLE EXECUTION OF ROBOTIC PROCESS AUTOMATION

FIELD

This relates generally to executing computer instructions, and more specifically to a platform for executing computer instructions in a secure and accountable manner using an immutable and decentralized ledger system (e.g., a blockchain ledger).

BACKGROUND

Routine and repetitive manual processes are increasingly subject to automation. Computers may execute routine tasks much more quickly and with greater accuracy, representing a compelling value proposition for businesses. However, automated processes (e.g., computer scripts) can present challenges in highly regulated industries and/or industries subject to auditing. Whereas a person may testify to the procedures they manually executed, validation of automated process may be more difficult. For example, it may be difficult to determine if a computer script was executed without interference or modification, if the script has been tampered with, and/or if the script is actually performing its function as advertised.

SUMMARY

As explained above, validation of automated processes is difficult and cumbersome in accordance with known methods. Therefore, there is a need for secure and accountable methods for executing and validating automated processes.

Businesses are increasingly turning to workflow automation tools to automate routine processes. One example of such automation is robotic process automation. In some embodiments, robotic process automation ("RPA") can perform tasks that are ordinarily performed by humans. For example, a human worker may receive an email invoice from a vendor and enter relevant information into a different system for payment processing. This workflow may be especially ripe for automation because it may not require complex decision-making. For example, the same actions may be consistently performed given the same input (e.g., a vendor name may always be populated in the vendor name field, and the amount payable may always be populated in the amount payable field). In some embodiments, an RPA program may monitor a user's actions in response to context data and automatically generate an RPA script that can perform the routine workflow. In some embodiments, a developer may generate an RPA script that can perform the routine workflow. In some embodiments, an RPA script may generate a log file comprising results and methods used during the execution process.

RPA may offer benefits in addition to substantial gains in labor efficiency. In some embodiments, RPA may leverage the benefits of automation and/or computer code predictability to remove human biases from sensitive (and highly regulated) processes such as loan approval. For example, RPA may be used in mortgage approval processes may help to ensure compliance with fair lending laws. Where a human may consciously or subconsciously consider prohibited factors (e.g., race, gender, etc.) in deciding whether to approve a mortgage, RPA can essentially guarantee exclusion of prohibited factors from consideration.

In examples where RPA is used to automate regulated and/or sensitive processes, it can be desirable to provide a secure and accountable environment for RPA execution. For example, an external auditor may audit a bank's compliance with fair lending laws. In some embodiments, a human-operated process may be audited by an auditor examining instruction documentation and correspondence, watching a human perform the process, etc. In some embodiments, an RPA-operated process may be more difficult to audit. For example, it may not be feasible for a human auditor to observe an RPA script execution (e.g., to evaluate if the RPA script is performing the proper steps). It may also not be feasible for a human auditor to determine if an RPA script has been tampered with. In some embodiments, it may also be infeasible for a human auditor to determine if an RPA log file has been tampered with.

As explained herein, distributed ledger (e.g., blockchain) technology can offer a solution for secure and accountable execution and auditing of RPA scripts. In some embodiments, blockchain technology offers a tamper-resistant method for demonstrating the integrity of an RPA script and the integrity of results of an RPA script. For example, an authorized developer may create a reference block (e.g., a block n) on a blockchain with a verified RPA script and verified tools needed to run the RPA script. In some embodiments, future executions of the RPA script may compare a retrieved RPA script and tools with the reference block to determine the integrity of the retrieved files. In some embodiments, if the retrieved files are verified as untampered, the RPA script may run, and the results of the execution may be placed as a new block on the blockchain. A crowd-verified and decentralized blockchain may enable a secure and accountable execution of RPA scripts and also enable transparent verification that RPA scripts are working as intended.

In some embodiments, an exemplary system for validating an execution of a set of computer instructions comprises: one or more processors; and memory storing one or more programs, wherein the one or more programs are configured to be executable by the one or more processors to cause the system to: receive a first cryptographic hash, the first cryptographic hash corresponding to the set of computer instructions; receive a second cryptographic hash, the second cryptographic hash corresponding to a runtime utility, wherein the runtime utility is configured to execute the set of computer instructions; generate a ledger entry comprising the first cryptographic hash, the second cryptographic hash, and an indicator of success; and add the ledger entry to a blockchain ledger, wherein the blockchain ledger is configured to receive the ledger entry from an authenticated node.

In some embodiments, the one or more programs are configured to be executable by the one or more processors to cause the system to: receive data indicating a location of the set of computer instructions; and receive data indicating a location of the runtime utility.

In some embodiments, the ledger entry comprises one or more of the data indicating the location of the set of computer instructions and the data indicating the location of the runtime utility.

In some embodiments, one or more of the set of computer instructions and the runtime utility is received from a remote database.

In some embodiments, one or more of the set of computer instructions and the runtime utility is received from a distributed database.

In some embodiments, the one or more programs are configured to be executable by the one or more processors to cause the system to: receive data comprising the set of computer instructions; and receive data comprising the runtime utility.

In some embodiments, the ledger entry comprises one or more of the data comprising the set of computer instructions and the data comprising the runtime utility.

In some embodiments, the one or more programs are configured to be executable by the one or more processors to cause the system to: receive a log file; receive a third cryptographic hash corresponding to the log file; extract, from the log file, data comprising a location of a dependent program, wherein the dependent program is configured to be executed during an execution of the set of computer instructions; receive a fourth cryptographic hash corresponding to the dependent program; and wherein generating the ledger entry comprises adding to the ledger entry the third cryptographic hash, data comprising the location of the dependent program, and the fourth cryptographic hash.

In some embodiments, an exemplary computer-enabled method for validating an execution of a set of computer instructions, comprises: receiving a first cryptographic hash, the first cryptographic hash corresponding to the set of computer instructions; receiving a second cryptographic hash, the second cryptographic hash corresponding to a runtime utility, wherein the runtime utility is configured to execute the set of computer instructions; generating a ledger entry comprising the first cryptographic hash, the second cryptographic hash, and an indicator of success; and adding the ledger entry to a blockchain ledger, wherein the blockchain ledger is configured to receive the ledger entry from an authenticated node.

In some embodiments, the method further comprises: receiving a log file; receiving a third cryptographic hash corresponding to the log file; extracting, from the log file, data comprising a location of a dependent program, wherein the dependent program is configured to be executed during an execution of the set of computer instructions; receiving a fourth cryptographic hash corresponding to the dependent program; and wherein generating the ledger entry comprises adding to the ledger entry the third cryptographic hash, data comprising the location of the dependent program, and the fourth cryptographic hash.

In some embodiments, an exemplary non-transitory computer-readable storage medium stores one or more programs for validating an execution of a set of computer instructions, the one or more programs comprising instructions, which when executed by one or more processors of an electronic device, cause the one or more processors to execute a method comprising: receiving a first cryptographic hash, the first cryptographic hash corresponding to the set of computer instructions; receiving a second cryptographic hash, the second cryptographic hash corresponding to a runtime utility, wherein the runtime utility is configured to execute the set of computer instructions; generating a ledger entry comprising the first cryptographic hash, the second cryptographic hash, and an indicator of success; and adding the ledger entry to a blockchain ledger, wherein the blockchain ledger is configured to receive the ledger entry from an authenticated node.

In some embodiments, the method further comprises: receiving a log file; receiving a third cryptographic hash corresponding to the log file; extracting, from the log file, data comprising a location of a dependent program, wherein the dependent program is configured to be executed during an execution of the set of computer instructions; receiving a fourth cryptographic hash corresponding to the dependent program; and wherein generating the ledger entry comprises adding to the ledger entry the third cryptographic hash, data comprising the location of the dependent program, and the fourth cryptographic hash.

In some embodiments, an exemplary system for validating an execution of a set of computer instructions, comprises: one or more processors; and memory storing one or more programs, wherein the one or more programs are configured to be executable by the one or more processors to cause the system to: identify a first ledger entry of a blockchain ledger, the first ledger entry comprising an indicator of success, a first cryptographic hash corresponding to a reference set of computer instructions, and a second cryptographic hash corresponding to a reference runtime utility; receive an unverified set of computer instructions based on the first ledger entry; compare a third cryptographic hash corresponding to the unverified set of computer instructions to the first cryptographic hash; receive an unverified runtime utility based on the first ledger entry, wherein the unverified runtime utility is configured to execute the second set of computer instructions; compare a fourth cryptographic hash corresponding to the unverified runtime utility to the second cryptographic hash; in response to a determination that the third cryptographic hash corresponds to the first cryptographic hash and that the fourth cryptographic hash corresponds to the second cryptographic hash: execute the unverified set of computer instructions using the unverified runtime utility; generate a second ledger entry comprising the third cryptographic hash, the fourth cryptographic hash, and a fifth cryptographic hash corresponding to a result of executing the unverified set of computer instructions; and add the second ledger entry to the blockchain ledger.

In some embodiments, the first ledger entry is the most recent ledger entry comprising an indicator of success.

In some embodiments, the second ledger entry comprises an indicator of success.

In some embodiments, the set of computer instructions is received from the blockchain ledger.

In some embodiments, the runtime utility is received from the blockchain ledger.

In some embodiments, the blockchain ledger is configured to receive the ledger entry from an authenticated node.

In some embodiments, an exemplary computer-enabled method for validating an execution of a set of computer instructions, comprises: identifying a first ledger entry of a blockchain ledger, the first ledger entry comprising an indicator of success, a first cryptographic hash corresponding to a reference set of computer instructions, and a second cryptographic hash corresponding to a reference runtime utility; receiving an unverified set of computer instructions based on the first ledger entry; comparing a third cryptographic hash corresponding to the unverified set of computer instructions to the first cryptographic hash; receiving an unverified runtime utility based on the first ledger entry, wherein the unverified runtime utility is configured to execute the second set of computer instructions; comparing a fourth cryptographic hash corresponding to the unverified runtime utility to the second cryptographic hash; in response to a determination that the third cryptographic hash corresponds to the first cryptographic hash and that the fourth cryptographic hash corresponds to the second cryptographic hash: executing the unverified set of computer instructions using the unverified runtime utility; generating a second ledger entry comprising the third cryptographic hash, the fourth cryptographic hash, and a fifth cryptographic hash corresponding to a result of executing the unverified set of computer instructions; and adding the second ledger entry to the blockchain ledger.

In some embodiments, the first ledger entry is the most recent ledger entry comprising an indicator of success.

In some embodiments, an exemplary non-transitory computer-readable storage medium stores one or more programs for validating an execution of a set of computer instructions, the one or more programs comprising instructions, which when executed by one or more processors of an electronic device, cause the one or more processors to execute a method comprising: identifying a first ledger entry of a blockchain ledger, the first ledger entry comprising an indicator of success, a first cryptographic hash corresponding to a reference set of computer instructions, and a second cryptographic hash corresponding to a reference runtime utility; receiving an unverified set of computer instructions based on the first ledger entry; comparing a third cryptographic hash corresponding to the unverified set of computer instructions to the first cryptographic hash; receiving an unverified runtime utility based on the first ledger entry, wherein the unverified runtime utility is configured to execute the second set of computer instructions; comparing a fourth cryptographic hash corresponding to the unverified runtime utility to the second cryptographic hash; in response to a determination that the third cryptographic hash corresponds to the first cryptographic hash and that the fourth cryptographic hash corresponds to the second cryptographic hash: executing the unverified set of computer instructions using the unverified runtime utility; generating a second ledger entry comprising the third cryptographic hash, the fourth cryptographic hash, and a fifth cryptographic hash corresponding to a result of executing the unverified set of computer instructions; and adding the second ledger entry to the blockchain ledger.

In some embodiments, the first ledger entry is the most recent ledger entry comprising an indicator of success.

In some embodiments, any one or more of the characteristics of any one or more of the systems, methods, and/or computer-readable storage mediums recited above may be combined, in whole or in part, with one another and/or with any other features or characteristics described elsewhere herein.

BRIEF DESCRIPTION OF THE FIGURES

FIG. 1 depicts an exemplary process for creating a reference ledger entry, according to some embodiments.

DETAILED DESCRIPTION

Figure 2A:
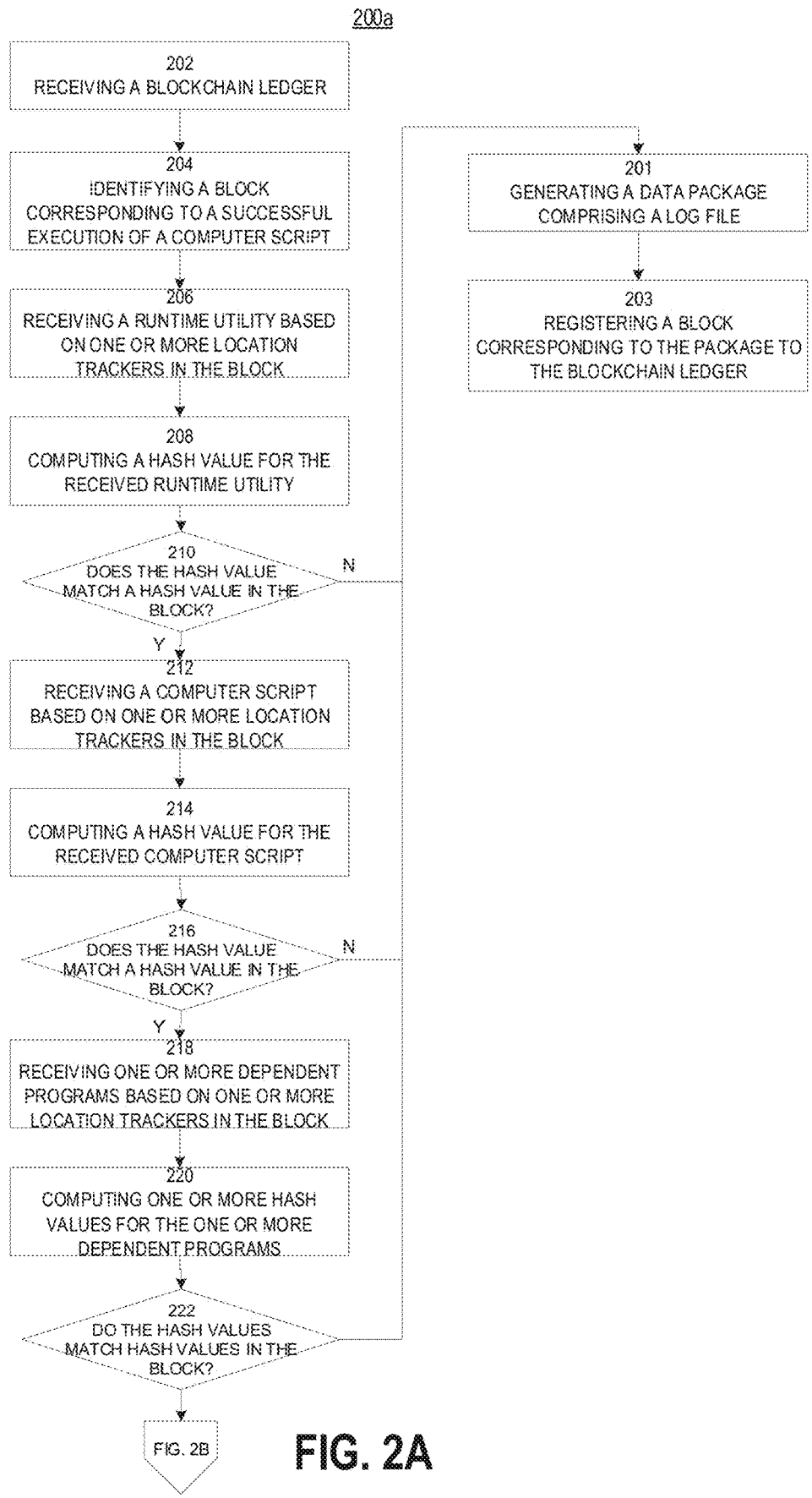
FIG. 2A depicts an exemplary process for verifying file integrity based on a reference ledger entry, according to some embodiments.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

The present disclosure relates to techniques for securely accounting for execution of RPA scripts using an immutable and decentralized ledger system (e.g., a blockchain ledger).

The following description sets forth exemplary methods, parameters, and the like. It should be recognized, however, that such description is not intended as a limitation on the scope of the present disclosure but is instead provided as a description of exemplary embodiments.

Although the following description uses terms "first," "second," etc. to describe various elements, these elements should not be limited by the terms. These terms are only used to distinguish one element from another. For example, a first graphical representation could be termed a second graphical representation, and, similarly, a second graphical representation could be termed a first graphical representation, without departing from the scope of the various described embodiments. The first graphical representation and the second graphical representation are both graphical representations, but they are not the same graphical representation.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

In some embodiments, an RPA script includes computer code configured to automatically execute a process that may have traditionally been performed by a human operator (e.g., processing invoices, preparing periodic reports, granting mortgage applications, etc.). It can be beneficial to use an RPA script for a number of reasons. For example, RPA scripts may execute the same process quicker and more accurately than a human operator. In some embodiments, RPA scripts may be used in applications in which the avoidance of conscious and/or subconscious human bias from process execution is critical (e.g., because an RPA script may be configured to not consider prohibited factors in its decision-making). Unlike application-based automation (e.g., visual basic for applications), RPA may be application independent and/or platform independent. For example, an RPA script may be able to manipulate and transfer data between a word processing program, an email program, a web browser, and a customized interface with an internal database. RPA scripts therefore may be capable of automating a full range of necessary processes. As a result, it is becoming increasingly desirable to implement RPA scripts to automate business activity.

In some embodiments, an RPA script may include static code (e.g., an RPA script may have a fixed and/or unchanging source code). In some embodiments, an RPA script may be written by a developer to automate one or more particular processes. In some embodiments, an RPA script may be generated automatically. For example, a process, sub-process, thread, and/or service may be integrated into an operating system (e.g., Windows or Linux). In some embodiments, a service may operate as a background service on host machines (e.g., employee computers). A process, sub-process, thread, and/or service may continually monitor actions taken by a user, actions taken by a program on behalf of a user, etc. For example, a process, sub-process, thread, and/or service may observe that a user opens an email received from "invoices@company.com" and downloads an attachment titled "April Invoice." A process, sub-process, thread, and/or service may observe that a user copies a number next to text that reads "Amount Owed" and enters the number into a user interface for an internal database. A process, sub-process, thread, and/or service may then generate an RPA script based on observations of user activity. An RPA script may use APIs to interface directly with relevant applications, an RPA script may interface with applications indirectly through, for example, keyboard and mouse control, or any other interface methods may be used.

In some embodiments, a process, sub-process, thread, and/or service used to create RPA scripts may not be integrated into an operating system. For example, a process, sub-process, thread, and/or service may query an operating system and/or other processes, services, or threads to determine what actions a user has performed. In some embodiments, a process, sub-process, thread, and/or service may run with administrative privileges, which may allow it to query the operating system. In some embodiments, a process, sub-process, thread, and/or service may query a remote process, sub-process, thread, and/or service over a network. In some embodiments, a process, sub-process, thread, and/or service may query multiple remote processes, sub-processes, threads, and/or services locally, over a network, or both locally and over a network.

In some embodiments, a process, sub-process, thread, and/or service used to create RPA scripts may be configured to execute a service and/or application programming interface to other software. For example, a process, sub-process, thread, and/or service may include a monitoring process/service, which may interface with software that may generate an RPA script. In some embodiments, monitoring processes/services may provide user actions and/or context data (e.g., which applications are open, which actions have been performed on which applications, etc.) to software that may generate an RPA script. In some embodiments, software used to generate RPA scripts may be configured to receive such information at scheduled intervals, in response to a user action, in response to opening/closing an application, and/or in accordance with determining that one or more trigger conditions have been met.

In some embodiments, an RPA script may include machine learning and/or artificial intelligence capabilities. For example, data collected on user actions and contextual information may be used to train a neural network. A trained neural network may then be used to predict what process should be run given contextual information (e.g., an email sender address, subject line, attachment name, etc.). In some embodiments, an RPA script that includes a neural network (or other form of artificial intelligence) may enable the RPA script to automate more complex processes that require decision-making.

An RPA script may run using a runtime utility. In some embodiments, an RPA script may include uncompiled code, and a runtime utility may receive uncompiled code as an input to generate a compiled executable and/or binary file as an output. In some embodiments, a runtime utility may be configured to execute an output executable and/or binary file. In some embodiments, an output executable and/or binary file may call one or more external programs that may be used in executing an RPA script. For example, an RPA script may rely on a word processing application to perform one or more steps during execution. An RPA script (or an executable and/or binary file based on an RPA script) may open the dependent application to execute its function.

FIG. 1 illustrates an exemplary process 100 for placing a reference ledger entry (e.g., a block) on a distributed ledger system (e.g., a blockchain). In some embodiments, exemplary process 100 can be used to create a block n on a blockchain. In some embodiments, block n can follow a genesis block (where a genesis block may be a first block on a blockchain). In some embodiments, block n can be a genesis block. In some embodiments, an authorized developer may perform or cause an electronic device to perform process 100 to establish a reference for executing a computer script. For example, an auditor may have audited source code for an RPA script and approved the methodologies used in the RPA script. A developer may use process 100 to create a block n of a blockchain, which may be referenced by future executions of the computer script. In some embodiments, future executions of the computer script may be cross-checked against a previously successful and/or verified execution (e.g., an execution corresponding to a block n) to verify the integrity of the new execution.

Process 100 is performed, for example, using one or more electronic devices implementing a software platform. In some examples, process 100 is performed using a client-server system, and the steps of process 100 are divided up in any manner between the server and a client device. In other examples, the steps of process 100 are divided up between the server and multiple client devices. Thus, while portions of process 100 are described herein as being performed by particular devices of a client-server system, it will be appreciated that process 100 is not so limited. In other examples, process 100 is performed using multiple client devices. In process 100, some steps are, optionally, combined, the order of some steps is, optionally, changed, and some steps are, optionally, omitted. In some examples, additional steps may be performed in combination with the process 100. Accordingly, the operations as illustrated (and described in greater detail below) are exemplary by nature and, as such, should not be viewed as limiting.

At step 102, a computer script (e.g., an RPA script) may be executed using a runtime utility. In some embodiments, the computer script may be manually created by a developer. In some embodiments, the computer script may be automatically generated by a process, sub-process, thread, and/or service used to automatically generate RPA scripts. In some embodiments, the computer script may include a trained neural network. In some embodiments, the computer script may include uncompiled code, and a runtime utility may be configured to receive the uncompiled code and generate a compiled executable and/or binary file. In some embodiments, the runtime utility may be configured to execute the compiled executable and/or binary file.

At step 104, a log file may be produced as a result of executing the computer script. In some embodiments, a log file can comprise multiple component files. In some embodiments, the computer script may be configured to produce a log file during its execution and/or after completion of its execution. In some embodiments, the log file can comprise metadata about the script execution. For example, the log file may include data on whether or not the script execution was successful. In some embodiments, the log file can include data regarding a time when the script was accessed, a time when the script was run, and/or a time when the log file was generated. In some embodiments, the log file may include one or more error messages and/or codes. In some embodiments, the log file can indicate which, if any, aspects of script execution failed. For example, the log file can indicate that a dependent program was not accessible and/or could not be verified. In some embodiments, the log file can comprise data about a user executing the computer script. For example, the computer script may query what user is executing the script, what device the user is executing the script from, etc. and provide that information in a log file. In some embodiments, a log file can comprise data regarding any dependent programs that may have been used during the execution of the computer script. For example, the log file may indicate which dependent programs were accessed, a version of the dependent program at time of execution, and/or where a dependent program was accessed from.

At step 106, a plurality of hash values can be generated, the plurality of hash values corresponding to the computer script, runtime utility, and log file. In some embodiments, each file may have one respective hash value. In some embodiments, files used to execute a computer script (e.g., the computer script itself, a runtime utility configured to execute the script, and/or a log file resulting from the script's execution) can be cryptographically hashed. In some embodiments, a hash can include a string of characters that represent a source file's contents. Hashing files used to execute a computer script can provide a simple way to verify that a file has been faithfully replicated/retrieved. In some embodiments, any change to a source file may result in a different cryptographic hash. Any hashing algorithm can be used (e.g., MD5, secure hash algorithms (SHA), etc.). In an embodiment where process 100 is used to create a reference block, hashing a verified script and/or tools used to execute the script may enable a later execution to verify the integrity of the files used for script execution (e.g., by comparing a hash of files used to a hash of the reference files).

At step 108, a plurality of location trackers may be generated, the plurality of location trackers corresponding to the computer script, runtime utility, and log file. In some embodiments, each file may have one respective location tracker. In some embodiments, reference files (e.g., approved files that may serve as a comparison basis for future script executions) may be stored at a remote location (e.g., at a location outside of the blockchain). In some embodiments, reference files may be stored in an external database. In some embodiments, reference files may be stored across multiple databases. In some embodiments, reference files may be split across multiple decentralized databases. In some embodiments, one or more location trackers can be used to locate reference files from remote storage. In some embodiments, reference files may be stored directly on the blockchain, and location trackers may not be necessary. In some embodiments, reference files may be too large to feasibly store directly on a blockchain, and location trackers may serve as a more computationally efficient alternative. In some embodiments, location trackers may be hashed. In some embodiments, the script, runtime utility, and log file may each have a corresponding location tracker (e.g., pointer) indicating a respective off-chain storage location for the respective component; in some embodiments, the script, runtime utility, and log file may each be stored directly on the blockchain; in some embodiments, one or more of the script, runtime utility, and log file may have a corresponding location tracker (e.g., pointer) indicating a respective off-chain storage location and one or more of the script, runtime utility, and log file may have be stored directly on the blockchain.

At step 110, a data package comprising the plurality of hash values and the plurality of location trackers may be generated. In some embodiments, the data package can include enough data such that the approved reference files can be located/retrieved (e.g., using one or more location trackers) and their integrity may be verified (e.g., by comparing hash values of retrieved files against hash values stored in the data package).

At step 112, a block corresponding to the data package can be registered to a blockchain ledger. In some embodiments, the block may be a genesis block (e.g., a first block in a blockchain). In some embodiments, the block may not be a genesis block (e.g., it may not be the first block in a blockchain, and in some embodiment may follow a genesis block). In some embodiments, a block may be registered to a blockchain if a majority of nodes agree to register it. In some embodiments, each node may include instructions for when it may be appropriate to register a block to a blockchain (e.g., the block must contain hash values and/or a location tracker).

In some embodiments, a blockchain used in process 100 may include smart contract capability, which may execute before or during registering a block to a blockchain. For example, a block may include programmable logic that may be executable by a node (e.g., a computer with read and/or write access to the blockchain), and the results of the programmable logic may be stored in a block on the blockchain. In some embodiments, a blockchain may be configured to perform one or more actions in response to receiving one or more designated inputs. For example, at step 112, programmable logic may receive a log file and extract data corresponding to one or more dependent programs used in executing the computer script at step 113A. In some embodiments, programmable logic may generate and/or receive one or more hash values corresponding to the one or more dependent programs at step 113B. In some embodiments, programmable logic may generate and/or receive one or more location trackers corresponding to the one or more dependent programs at step 113B. In some embodiments, this data may enable faithful retrieval and/or reproduction of dependent programs that may be used in the execution of an RPA script. In some embodiments, programmable logic may determine a result of the script execution (e.g., by parsing a log file) at step 113C. In some embodiments, a block n may correspond to a successful execution of the computer script, and the block n may indicate that the corresponding script execution was successful (e.g., using a bit flag). In some embodiments, programmable logic and/or results of programmable logic may be included in the block before or during registration to a blockchain. In some embodiments, results of programmable logic may not be registered to a blockchain unless a majority of nodes agree upon the result.

In some embodiments, other steps of process 100 may be performed by programmable logic of a blockchain. For example, steps 102, 104, 106, 108, and/or 110 may be performed by programmable logic of a blockchain. In some embodiments, a computer script, a runtime utility, and/or a log file may be provided to a blockchain including programmable logic. In some embodiments, the blockchain may use programmable logic to compute hash values corresponding to files used in script execution. In some embodiments, the blockchain may use programmable logic to generate one or more location trackers corresponding to one or more files used in script execution.

In some embodiments, a blockchain may not include programmable logic. For example, a separate process, subprocess, thread, and/or service may identify one or more dependent programs used in executing a computer script (e.g., by parsing a log file), generate one or more hashes corresponding to the dependent programs, and/or generate one or more location trackers corresponding to the one or more dependent programs. In some embodiments, this data may be used to generate a data package corresponding to a block, and the block may be registered to a blockchain.

In some embodiments, a blockchain (e.g., a blockchain used in process 100) may be a permissioned blockchain. For example, a blockchain used in process 100 may only allow authorized and/or authenticated nodes write access to the blockchain. In some embodiments, only authorized and/or authenticated nodes may be used to determine if a consensus has been reached (e.g., to register a new block to the blockchain). In some embodiments, a permissioned blockchain may rely on proof-of-work and/or proof-of-stake methods to register a new block to the blockchain. In some embodiments, a permissioned blockchain may rely on proof-of-authority to register a new block to the blockchain. In some embodiments, a node may be authorized and/or authenticated using one or more authentication tokens, although any suitable methods for authorization and/or authentication may be used.

In some embodiments, a blockchain (e.g., a blockchain used in process 100) may be a private blockchain. For example, a blockchain used in process 100 may only allow authorized and/or authenticated nodes read access to the blockchain. In some embodiments, only authorized and/or authenticated nodes may be used to receive blocks and/or the blockchain. In some embodiments, a node may be authorized and/or authenticated using one or more authentication tokens, although any suitable methods for authorization and/or authentication may be used.

At step 114, tracked files (e.g., files with one or more corresponding location trackers) may be distributed in accordance with the location trackers. For example, a location tracker can include a pointer that may point to a location in a database and/or file directory. In some embodiments, a file corresponding to the location tracker (e.g., a runtime utility) may be stored in the location in the database and/or file directory. In some embodiments, the location tracker may be used to locate the file corresponding to the location tracker.

At step 116, once a block has been registered to the blockchain, the new block and/or updated blockchain may be distributed to one or more nodes. In some embodiments, all nodes may receive the entire updated blockchain. In some embodiments, all nodes may receive the new block. In some embodiments, nodes that do not yet have the new block may receive the new block and/or updated blockchain.

FIG. 2A illustrates an exemplary process 200a for placing a ledger entry (e.g., a block) on a distributed ledger system (e.g., a blockchain). In some embodiments, process 200a may be used to ensure that script executions subsequent to a reference script execution receive accurate copies of programs used in a reference script execution.

Process 200a is performed, for example, using one or more electronic devices implementing a software platform. In some examples, process 200a is performed using a client-server system, and the steps of process 200a are divided up in any manner between the server and a client device. In other examples, the steps of process 200a are divided up between the server and multiple client devices. Thus, while portions of process 200a are described herein as being performed by particular devices of a client-server system, it will be appreciated that process 200a is not so limited. In other examples, process 200a is performed using multiple client devices. In process 200a, some steps are, optionally, combined, the order of some steps is, optionally, changed, and some steps are, optionally, omitted. In some examples, additional steps may be performed in combination with the process 200a. Accordingly, the operations as illustrated (and described in greater detail below) are exemplary by nature and, as such, should not be viewed as limiting.

At step 202, a blockchain ledger may be received. In some embodiments, the blockchain ledger may comprise a block n. In some embodiments, the blockchain ledger may comprise blocks subsequent to a block n (e.g., blocks registered after the block n).

At step 204, a block corresponding to a successful execution of a computer script can be identified. In some embodiments, a block may be identified by parsing its indication of success (e.g., evaluating whether a bit flag is a 1 or a 0). In some embodiments, the most recent block corresponding to a successful execution of a computer script may be identified. In some embodiments, a block n may be identified. In some embodiments, a block n+x (where x may include an integer greater than or equal to 1) may be identified (e.g., a block subsequent to a block n corresponding to a successful script execution).

At step 206, a runtime utility may be received based on one or more location trackers in the successful block. In some embodiments, a runtime utility can be configured to compile and/or execute a computer script. In some embodiments, a runtime utility may be retrieved from a location indicated by one or more location trackers in the successful block. In some embodiments, metadata stored in the successful block may indicate which one or more location trackers correspond to a runtime utility.

At step 208, a hash value may be computed for the runtime utility. In some embodiments, the hash value may be computed using the same hashing algorithm that may have been used in the successful block.

At step 210, it can be determined if the computed hash value matches a hash value corresponding to the runtime utility and stored in the successful block. In some embodiments, metadata stored in the successful block may indicate which hash value corresponds to a runtime utility.

If it is determined that the computed hash value does not match a hash value corresponding to the runtime utility and stored in the successful block, a log file may be produced (e.g., by programmable logic in the blockchain). In some embodiments, the log file may include data regarding information about a user attempting to execute the utility (e.g., the user's identity and/or a device used), one or more location trackers used to receive the runtime utility, file system information (e.g., date and time of last modification of the runtime utility), and/or a computed hash of the received runtime utility. At step 201, a data package may be generated comprising the log file. At step 203, a new block corresponding to the data package may be registered to a blockchain ledger, and the blockchain ledger may be distributed to one or more nodes.

If it is determined that the computed hash value does match a hash value corresponding to the runtime utility and stored in the successful block, a computer script may be received based on one or more location trackers in the block at step 212. In some embodiments, the computer script may be configured to be compiled and/or executed by the runtime utility. In some embodiments, the computer script may be retrieved from a location indicated by one or more location trackers in the successful block. In some embodiments, metadata stored in the successful block may indicate which one or more location trackers correspond to the computer script.

At step 214, a hash value may be computed for the computer script. In some embodiments, the hash value may be computed using the same hashing algorithm that may have been used in the successful block.

At step 216, it can be determined if the computed hash value matches a hash value corresponding to the computer script and stored in the successful block. In some embodiments, metadata stored in the successful block may indicate which hash value corresponds to a runtime utility.

If it is determined that the computed hash value does not match a hash value corresponding to the computer script and stored in the successful block, a log file may be produced (e.g., by programmable logic in the blockchain). In some embodiments, the log file may include data regarding information about a user attempting to execute the utility (e.g., the user's identity and/or a device used), one or more location trackers used to receive the computer script and/or runtime utility, file system information (e.g., date and time of last modification of the computer script and/or runtime utility), and/or a computed hash of the received computer script and/or runtime utility. At step 201, a data package may be generated comprising the log file. At step 203, a new block corresponding to the data package may be registered to a blockchain ledger, and the blockchain ledger may be distributed to one or more nodes.

If it is determined that the computed hash value does match a hash value corresponding to the computer script and stored in the successful block, one or more dependent programs may be received based on one or more location trackers in the block at step 218. In some embodiments, the one or more dependent programs may be used by a computer script and/or runtime utility during script execution. In some embodiments, the one or more dependent programs may be retrieved from a location indicated by one or more location trackers in the successful block. In some embodiments, metadata stored in the successful block may indicate which one or more location trackers correspond to the one or more dependent programs.

At step 220, one or more hash values may be computed for the one or more dependent programs. In some embodiments, the one or more hash values may be computed using the same hashing algorithm that may have been used in the successful block.

At step 222, it can be determined if the one or more computed hash values match one or more hash values corresponding to the one or more dependent programs and stored in the successful block. In some embodiments, metadata stored in the successful block may indicate which hash values correspond to the one or more dependent programs.

If it is determined that the one or more computed hash values do not match one or more hash values corresponding to the dependent programs and stored in the successful block, a log file may be produced (e.g., by programmable logic in the blockchain). In some embodiments, the log file may include data regarding information about a user attempting to execute the utility (e.g., the user's identity and/or a device used), one or more location trackers used to receive the dependent programs, computer script, and/or runtime utility, file system information (e.g., date and time of last modification of the dependent programs, computer script, and/or runtime utility), and/or a computed hash of the received dependent programs, computer script, and/or runtime utility. At step 201, a data package may be generated comprising the log file. At step 203, a new block corresponding to the data package may be registered to a blockchain ledger, and the blockchain ledger may be distributed to one or more nodes.

If it is determined that the one or more computed hash values do match hash values corresponding to the dependent programs and stored in the successful block, it can be determined that all tools used to execute the computer script may have been successfully received as faithful copies. Although steps and/or conditions of process 200*a* may be described in a particular order, it is contemplated that steps and/or conditions of process 200*a* may be performed in any order. For example, steps 212, 214, and/or 216 may be performed before steps 206, 208, and/or 210, or steps 212, 214, and/or 216 may be performed after steps 218, 220, and/or 222, etc.

Figure 2B:
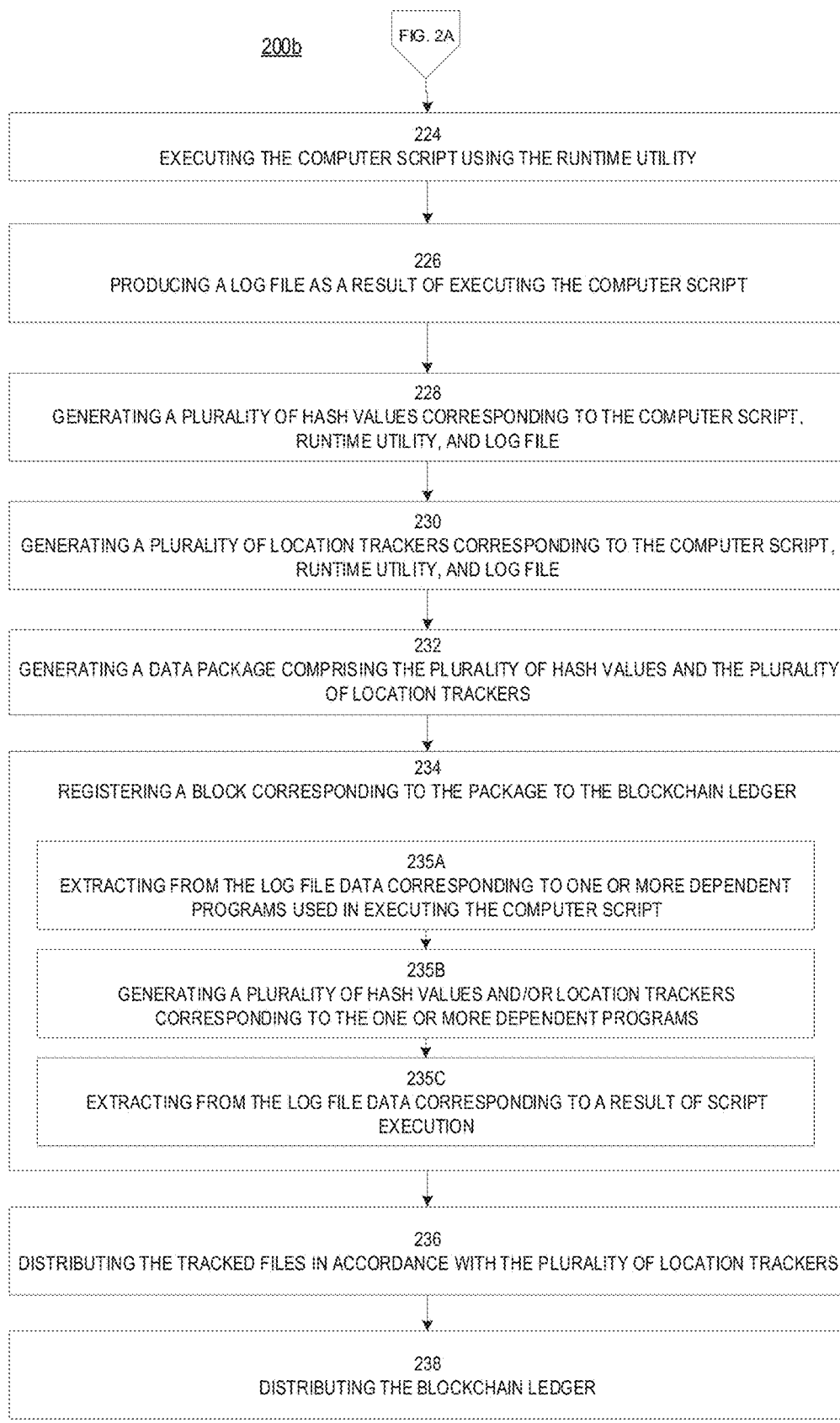
FIG. 2B depicts an exemplary process for creating a reference ledger entry, according to some embodiments.

FIG. 2B illustrates an exemplary process 200*b* for placing a ledger entry (e.g., a block) on a distributed ledger system (e.g., a blockchain). In some embodiments, process 200*b* in FIG. 2B may be used to faithfully record a result of a subsequent script execution.

At step 224, the received computer script may be compiled and/or executed by the received runtime utility using the received dependent programs. In some embodiments, the received computer script, the received runtime utility, and/or the received dependent programs can be the same script/utility/dependent programs received at steps 206, 212, and/or 218.

At step 226, a log file may be produced as a result of executing the script. In some embodiments, a log file can comprise multiple component files. In some embodiments, the computer script may be configured to produce a log file during its execution and/or after completion of its execution. In some embodiments, the log file can comprise metadata about the script execution. For example, the log file may include data on whether or not the script execution was successful. In some embodiments, the log file can include data regarding a time when the script was accessed, a time when the script was run, and/or a time when the log file was generated. In some embodiments, the log file may include one or more error messages and/or codes. In some embodiments, the log file can indicate which, if any, aspects of script execution failed. For example, the log file can indicate that a dependent program was not accessible and/or could not be verified. In some embodiments, the log file can comprise data about a user executing the computer script. For example, the computer script may query what user is executing the script, what device the user is executing the script from, etc. and provide that information in a log file. In some embodiments, a log file can comprise data regarding any dependent programs that may have been used during the execution of the computer script. For example, the log file may indicate which dependent programs were accessed, a version of the dependent program at time of execution, and/or where a dependent program was accessed from.

At step 228, a plurality of hash values can be generated, the plurality of hash values corresponding to the computer script, runtime utility, and log file. In some embodiments, each file may have one respective hash value. In some embodiments, files used to execute a computer script (e.g., the computer script itself, a runtime utility configured to execute the script, and/or a log file resulting from the script's execution) can be cryptographically hashed. In some embodiments, the hash values may be generated based on the hash values generated at steps 208, 214, and/or 220.

At step 230, a plurality of location trackers may be generated, the plurality of location trackers corresponding to the computer script, runtime utility, and log file. In some embodiments, each file may have one respective location tracker. In some embodiments, reference files (e.g., approved files that may serve as a comparison basis for future script executions) may be stored at a remote location (e.g., at a location outside of the blockchain). In some embodiments, reference files may be stored in an external database. In some embodiments, reference files may be stored across multiple databases. In some embodiments, reference files may be split across multiple decentralized databases. In some embodiments, one or more location trackers can be used to locate reference files from remote storage. In some embodiments, reference files may be stored directly on the blockchain, and location trackers may not be necessary. In some embodiments, reference files may be too large to feasibly store directly on a blockchain, and location trackers may serve as a more computationally efficient alternative. In some embodiments, location trackers may be hashed.

At step 232, a data package comprising the plurality of hash values and the plurality of location trackers may be generated. In some embodiments, the data package can include enough data such that the approved reference files can be located/retrieved (e.g., using one or more location trackers) and their integrity may be verified (e.g., by comparing hash values of retrieved files against hash values stored in the data package).

At step 234, a block corresponding to the data package can be registered to a blockchain ledger. In some embodiments, the block may not be a first block of a chain (e.g., rather than block n as discussed herein in embodiments in which block n is a first block of a chain, the may be block n+x in a blockchain, wherein x is any positive integer). In some embodiments, a block may be registered to a blockchain if a majority of nodes agree to register it. In some embodiments, each node may include instructions for when it may be appropriate to register a block to a blockchain (e.g., the block must contain hash values and/or a location tracker).

In some embodiments, a blockchain used in process 200b may include smart contract capability, which may execute before or during registering a block to a blockchain. For example, a block may include programmable logic that may be executable by a node (e.g., a computer with read and/or write access to the blockchain), and the results of the programmable logic may be stored in a block on the blockchain. In some embodiments, a blockchain may be configured to perform one or more actions in response to receiving one or more designated inputs. For example, at step 234, programmable logic may receive a log file and extract data corresponding to one or more dependent programs used in executing the computer script at step 235A. In some embodiments, programmable logic may generate and/or receive one or more hash values corresponding to the one or more dependent programs at step 235B. In some embodiments, programmable logic may generate and/or receive one or more location trackers corresponding to the one or more dependent programs at step 235B. In some embodiments, this data may enable faithful retrieval and/or reproduction of dependent programs that may be used in the execution of an RPA script. In some embodiments, programmable logic may determine a result of the script execution (e.g., by parsing a log file) at step 235C. In some embodiments, whether or not a script execution was successful can be indicated (e.g., using a bit flag). In some embodiments, programmable logic and/or results of programmable logic may be included in the block before or during registration to a blockchain. In some embodiments, results of programmable logic may not be registered to a blockchain unless a majority of nodes agree upon the result.

In some embodiments, other steps of process 200b may be performed by programmable logic of a blockchain. For example, steps 224, 226, 228, 230, and/or 232 may be performed by programmable logic of a blockchain. In some embodiments, a computer script, a runtime utility, and/or a log file may be provided to a blockchain including programmable logic. In some embodiments, the blockchain may use programmable logic to compute hash values corresponding to files used in script execution. In some embodiments, the blockchain may use programmable logic to generate one or more location trackers corresponding to one or more files used in script execution.

In some embodiments, a blockchain may not include programmable logic. For example, a separate process, subprocess, thread, and/or service may identify one or more dependent programs used in executing a computer script (e.g., by parsing a log file), generate one or more hashes corresponding to the dependent programs, and/or generate one or more location trackers corresponding to the one or more dependent programs. In some embodiments, this data may be used to generate a data package corresponding to a block, and the block may be registered to a blockchain.

In some embodiments, a blockchain (e.g., a blockchain used in process 200a and/or 200b) may be a permissioned blockchain. For example, a blockchain used in process 200a and/or 200b may only allow authorized and/or authenticated nodes write access to the blockchain. In some embodiments, only authorized and/or authenticated nodes may be used to determine if a consensus has been reached (e.g., to register a new block to the blockchain). In some embodiments, a permissioned blockchain may rely on proof-of-work and/or proof-of-stake methods to register a new block to the blockchain. In some embodiments, a permissioned blockchain may rely on proof-of-authority to register a new block to the blockchain. In some embodiments, a node may be authorized and/or authenticated using one or more authentication tokens, although any suitable methods for authorization and/or authentication may be used.

In some embodiments, a blockchain (e.g., a blockchain used in process 200a and/or 200b) may be a private blockchain. For example, a blockchain used in process 200a and/or 200b may only allow authorized and/or authenticated nodes read access to the blockchain. In some embodiments, only authorized and/or authenticated nodes may be used to receive blocks and/or the blockchain. In some embodiments, a node may be authorized and/or authenticated using one or more authentication tokens, although any suitable methods for authorization and/or authentication may be used.

At step 236, tracked files (e.g., files with one or more corresponding location trackers) may be distributed in accordance with the location trackers. For example, a location tracker can include a pointer that may point to a location in a database and/or file directory. In some embodiments, a file corresponding to the location tracker (e.g., a runtime utility) may be stored in the location in the database and/or file directory. In some embodiments, the location tracker may be used to locate the file corresponding to the location tracker.

At step 238, once a block has been registered to the blockchain, the new block and/or updated blockchain may be distributed to one or more nodes. In some embodiments, all nodes may receive the entire updated blockchain. In some embodiments, all nodes may receive the new block. In some embodiments, nodes that do not yet have the new block may receive the new block and/or updated blockchain.

Figure 3:
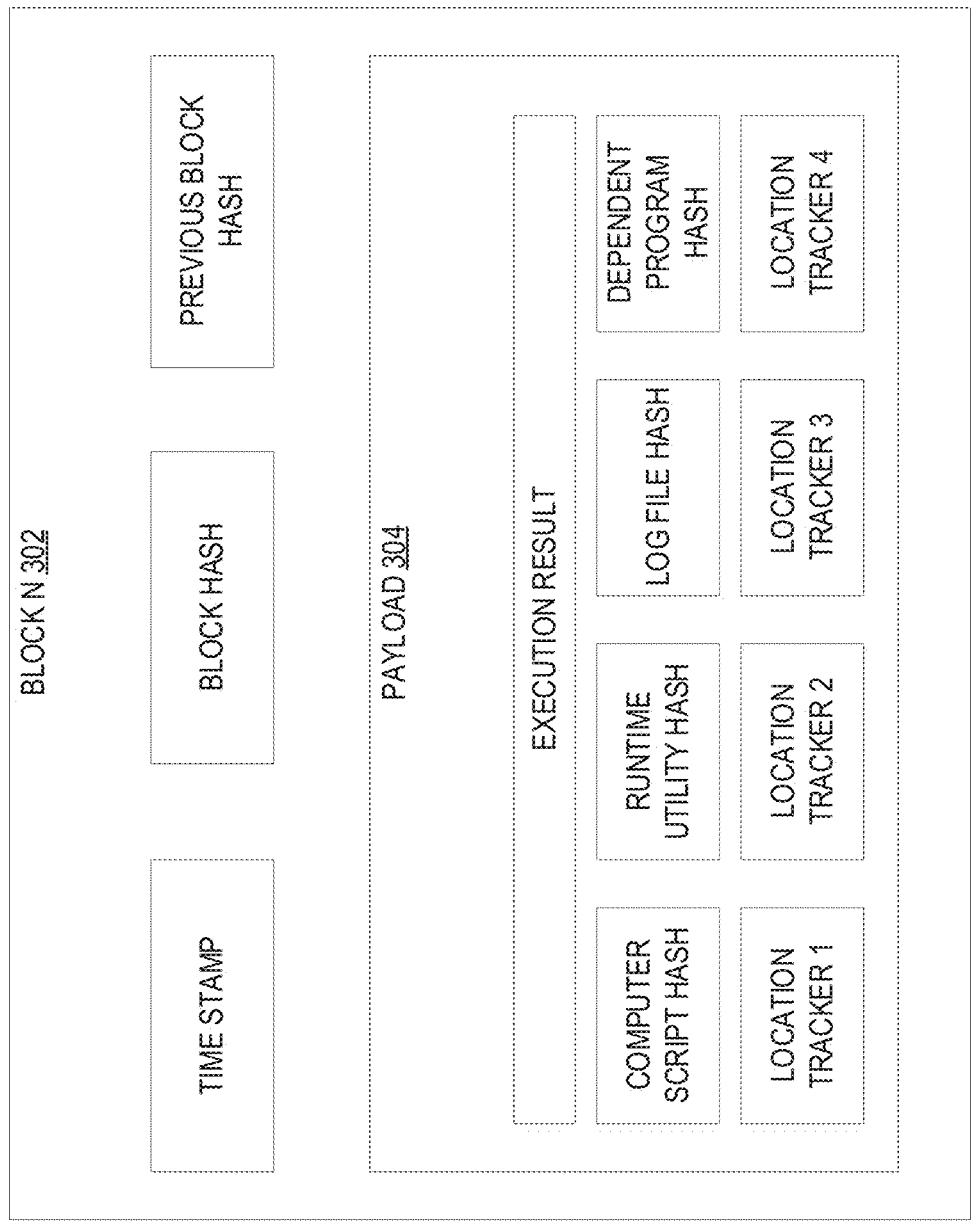
FIG. 3 depicts an exemplary ledger entry, according to some embodiments.

FIG. 3 illustrates an exemplary ledger entry (e.g., a block) of a distributed ledger system (e.g., a blockchain). In some embodiments, a blockchain can comprise one or more blocks (e.g., block 302). In some embodiments, block 302 can include a time stamp when the block was registered to the blockchain. In some embodiments, block 302 can include a hash value corresponding to the contents of the block. In some embodiments, block 302 can include a hash value corresponding to the contents of a previous block (e.g., the immediately previous block). In some embodiments, a hash value corresponding to the contents of a previous block produces a tamper-resistant chain. For example, tampering with contents of one block may yield a different hash value for the tampered block. Consequently, the tampered block may no longer match a hash value in an immediately subsequent block. The immediately subsequent block may therefore require tampering so that it confirms the tampered block, and the process may continue for the remainder of the blockchain.

In some embodiments, block 302 may include payload 304. In some embodiments, payload 304 may include an execution result. In some embodiments, an execution result can indicate whether a corresponding script execution was successful or not (e.g., using a bit flag). In some embodiments, an execution result can indicate what, if any, aspects of script execution failed (e.g., an execution result may include one or more error codes). In some embodiments, an execution result can include a hash value and/or location trackers corresponding to an execution result file.

In some embodiments, payload 304 may include hash values and/or location trackers corresponding to files used to execute a computer script. For example, payload 304 may include hash values and/or location trackers corresponding to the computer script, hash values and/or location trackers corresponding to a runtime utility configured to execute the computer script, hash values and/or location trackers corresponding to a log file produced as a result of executing the computer script, hash values and/or location trackers corresponding to one or more dependent programs used to execute the computer script, etc.

In some embodiments, payload 304 may include files used to execute a computer script directly. For example, a computer script, runtime utility, log file, and/or dependent programs may be stored directly in payload 304. In some embodiments, location trackers may not be necessary if files are stored directly in payload 304.

Figure 4:
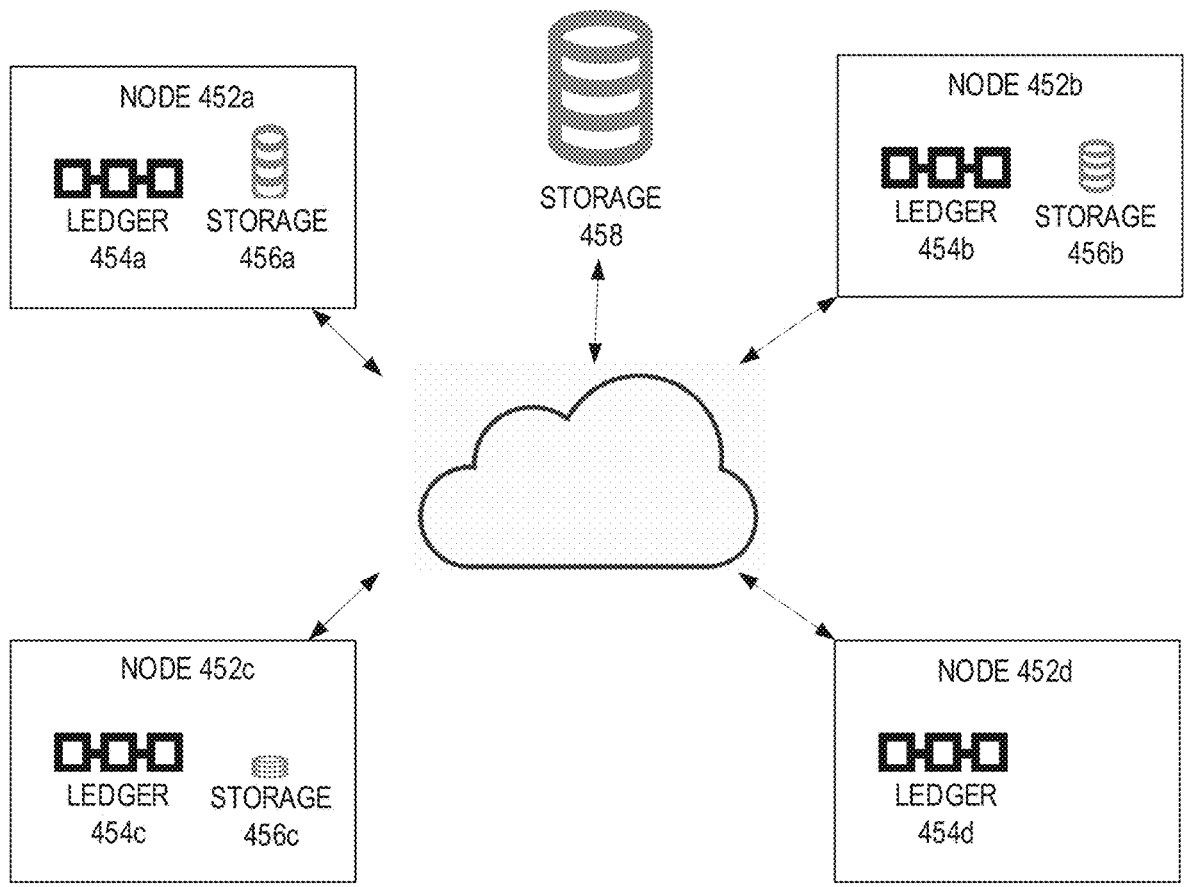
FIG. 4 depicts an example distributed network system comprising nodes, according to some embodiments.

FIG. 4 illustrates an example distributed network system 450 comprising nodes 452a-452d. The number of nodes may be fixed or vary with time. At each node (which can include one or more computer systems), a copy of a blockchain ledger (e.g., 454a-454d) may be stored and/or maintained. In some embodiments, the nodes can communicate via a peer-to-peer network. The distributed ledger can be updated when modifications to the ledger (e.g., insertion of a ledger entry) are made. The ledger copies 454a-d can provide cross-validation with one another in the event of conflicts between ledgers, and various cryptographic and/or hashing algorithms may be utilized during the generation, updating, deletion, linking, and so on, of ledger entries such that ledger entries have increased resiliency to unauthorized tampering or modification. In some embodiments, the nodes 452a-d are a part of a public network. In some embodiments, the nodes 452a-d are a part of private network requiring special permission to join.

In some embodiments, tool files used for execution of RPA scripts can be split and stored among one or more decentralized databases. For example, two or more of nodes 452a-452c (e.g., via data repositories 456a-c) may store all or portions of tools (e.g., a computer script, a runtime utility, a log file, and/or dependent programs). It should be appreciated that the nodes and/or system components hosting the decentralized ledger system can be the same or different from the nodes and/or system components providing distributed storage of the tool files. In the example depicted in FIG. 4, the decentralized ledger system resides on nodes 452a-d, while nodes 452a-c provide distributed storage of the tool files. In some embodiments (not illustrated), a node of the system may host one or more storage media for providing the distributed storage while not hosting a copy of the decentralized ledger. In the example depicted in FIG. 4, when portions of a tool file are retrieved from the nodes (e.g., nodes 452a-c) at a particular node (e.g., node 452a), the portions are assembled, hashed, and compared with the hash value stored at the local ledger to confirm that the portions had not been tampered with. In some embodiments, tool files may be stored on a centralized database (e.g., data repository 458), which may be remote from one or more nodes (e.g., data repository 458 may run on a different computer system than one or more nodes).

Figure 5:
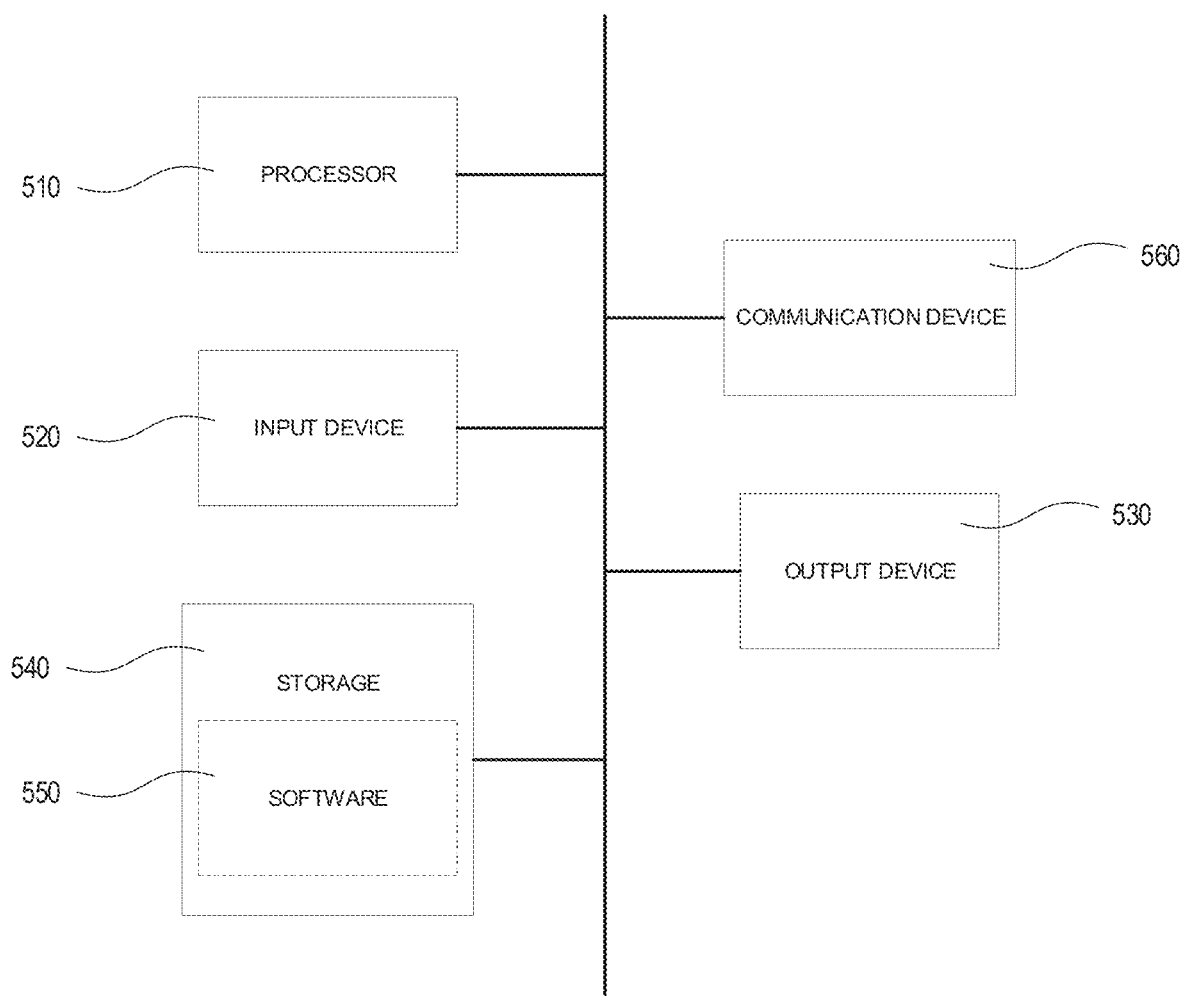
FIG. 5 depicts a computer, according to some embodiments.

FIG. 5 illustrates an example of a computing device in accordance with one embodiment. Device 500 can be a host computer connected to a network. Device 500 can be a client computer or a server. As shown in FIG. 5, device 500 can be any suitable type of microprocessor-based device, such as a personal computer, workstation, server or handheld computing device (portable electronic device) such as a phone or tablet. The device can include, for example, one or more of processor 510, input device 520, output device 530, storage 540, and communication device 560. Input device 520 and output device 530 can generally correspond to those described above, and can either be connectable or integrated with the computer.

Input device 520 can be any suitable device that provides input, such as a touch screen, keyboard or keypad, mouse, or voice-recognition device. Output device 530 can be any suitable device that provides output, such as a touch screen, haptics device, or speaker.

Storage 540 can be any suitable device that provides storage, such as an electrical, magnetic or optical memory including a RAM, cache, hard drive, or removable storage disk. Communication device 560 can include any suitable device capable of transmitting and receiving signals over a network, such as a network interface chip or device. The components of the computer can be connected in any suitable manner, such as via a physical bus or wirelessly.

Software 550, which can be stored in storage 540 and executed by processor 510, can include, for example, the programming that embodies the functionality of the present disclosure (e.g., as embodied in the devices as described above).

Software 550 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 540, that can contain or store programming for use by or in connection with an instruction execution system, apparatus, or device.

Software 550 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 500 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 500 can implement any operating system suitable for operating on the network. Software 550 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

The invention claimed is:

1. A system for validating an execution of a set of computer instructions, comprising:
one or more processors; and
memory storing one or more programs, wherein the one or more programs are configured to be executable by the one or more processors to cause the system to:
receive a first cryptographic hash, the first cryptographic hash corresponding to the set of computer instructions, wherein:
the set of computer instructions includes a robotic process automation (RPA) script generated based on data representing user actions, the RPA script being configured to automatically execute one or more processes, wherein the RPA script includes a neural network trained to predict at least one of the one or more processes to be executed based on contextual information, wherein the neural network is trained based on the data representing the user actions and contextual information related to the user actions;
receive a second cryptographic hash, the second cryptographic hash corresponding to a runtime utility, wherein the runtime utility is configured to execute the set of computer instructions to obtain a log file comprising an indicator of success indicating whether the set of computer instructions was successfully executed via the runtime utility;
generate a ledger entry comprising the first cryptographic hash, the second cryptographic hash, the indicator of success, and data comprising the set of computer instructions; and
add the ledger entry to a blockchain ledger, wherein the blockchain ledger is configured to receive the ledger entry from an authenticated node, the authenticated node being one of a plurality of authenticated nodes of a distributed network each configured to store a copy of at least some of the blockchain ledger.

2. The system of claim 1, wherein the one or more programs are configured to be executable by the one or more processors to cause the system to:
receive data indicating a location of the set of computer instructions; and
receive data indicating a location of the runtime utility.

3. The system of claim 2, wherein the ledger entry comprises one or more of the data indicating the location of the set of computer instructions and the data indicating the location of the runtime utility.

4. The system of claim 2, wherein one or more of the set of computer instructions and the runtime utility is received from a remote database.

5. The system of claim 2, wherein one or more of the set of computer instructions and the runtime utility is received from a distributed database.

6. The system of claim 1, wherein the one or more programs are configured to be executable by the one or more processors to cause the system to:
receive the data comprising the set of computer instructions; and
receive data comprising the runtime utility.

7. The system of claim 6, wherein the ledger entry comprises the data comprising the runtime utility.

8. The system of claim 1, wherein the one or more programs are configured to be executable by the one or more processors to cause the system to:
receive the log file;
receive a third cryptographic hash corresponding to the log file;

extract, from the log file, data comprising a location of a dependent program, wherein the dependent program is configured to be executed during an execution of the set of computer instructions;
receive a fourth cryptographic hash corresponding to the dependent program; and
wherein generating the ledger entry comprises adding, to the ledger entry, the third cryptographic hash, data comprising the location of the dependent program, and the fourth cryptographic hash.

9. The system of claim 1, wherein the log file comprising the indicator of success indicates whether the set of computer instructions including the trained neural network was successfully executed via the runtime utility, and the ledger entry comprising the data comprises the set of computer instructions including the trained neural network.

10. The system of claim 1, wherein the RPA script is configured to use an application programming interfaces (API) to interface with applications.

11. The system of claim 1, wherein the user actions are detected by a background service configured to automatically generate the RPA script.

12. The system of claim 1, wherein the RPA script is at least one of application independent or platform independent.

13. A computer-enabled method for validating an execution of a set of computer instructions, comprising:
receiving a first cryptographic hash, the first cryptographic hash corresponding to the set of computer instructions, wherein:
the set of computer instructions includes a robotic process automation (RPA) script generated based on data representing user actions, the RPA script being configured to automatically execute one or more processes, wherein the RPA script includes a neural network trained to predict at least one of the one or more processes to be executed based on contextual information, wherein the neural network is trained based on the data representing the user actions and contextual information related to the user actions;
receiving a second cryptographic hash, the second cryptographic hash corresponding to a runtime utility, wherein the runtime utility is configured to execute the set of computer instructions to obtain a log file comprising an indicator of success indicating whether the set of computer instructions was successfully executed via the runtime utility;
generating a ledger entry comprising the first cryptographic hash, the second cryptographic hash, the indicator of success, and data comprising the set of computer instructions; and
adding the ledger entry to a blockchain ledger, wherein the blockchain ledger is configured to receive the ledger entry from an authenticated node, the authenticated node being one of a plurality of authenticated nodes of a distributed network each configured to store a copy of at least some of the blockchain ledger.

14. The computer-enabled method of claim 13, further comprising:
receiving the log file;
receiving a third cryptographic hash corresponding to the log file;
extracting, from the log file, data comprising a location of a dependent program, wherein the dependent program is configured to be executed during an execution of the set of computer instructions;
receiving a fourth cryptographic hash corresponding to the dependent program; and
wherein generating the ledger entry comprises adding, to the ledger entry, the third cryptographic hash, data comprising the location of the dependent program, and the fourth cryptographic hash.

15. A non-transitory computer-readable storage medium storing one or more programs for validating an execution of a set of computer instructions, the one or more programs comprising instructions, which when executed by one or more processors of an electronic device, cause the one or more processors to execute a method comprising:
receiving a first cryptographic hash, the first cryptographic hash corresponding to the set of computer instructions, wherein:
the set of computer instructions includes a robotic process automation (RPA) script generated based on data representing user actions, the RPA script being configured to automatically execute one or more processes, wherein the RPA script includes a neural network trained to predict at least one of the one or more processes to be executed based on contextual information, wherein the neural network is trained based on the data representing the user actions and contextual information related to the user actions;
receiving a second cryptographic hash, the second cryptographic hash corresponding to a runtime utility, wherein the runtime utility is configured to execute the set of computer instructions to obtain a log file comprising an indicator of success indicating whether the set of computer instructions was successfully executed via the runtime utility;
generating a ledger entry comprising the first cryptographic hash, the second cryptographic hash, the indicator of success, and data comprising the set of computer instructions; and
adding the ledger entry to a blockchain ledger, wherein the blockchain ledger is configured to receive the ledger entry from an authenticated node, the authenticated node being one of a plurality of authenticated nodes of a distributed network each configured to store a copy of at least some of the blockchain ledger.

16. The non-transitory computer-readable storage medium of claim 15, the method further comprising:
receiving the log file;
receiving a third cryptographic hash corresponding to the log file;
extracting, from the log file, data comprising a location of a dependent program, wherein the dependent program is configured to be executed during an execution of the set of computer instructions;
receiving a fourth cryptographic hash corresponding to the dependent program; and
wherein generating the ledger entry comprises adding to the ledger entry the third cryptographic hash, data comprising the location of the dependent program, and the fourth cryptographic hash.

17. A system for validating an execution of a set of computer instructions, comprising:
one or more processors; and
memory storing one or more programs, wherein the one or more programs are configured to be executable by the one or more processors to cause the system to:
identify a first ledger entry of a blockchain ledger, the first ledger entry comprising an indicator of success, a first cryptographic hash corresponding to a reference set of computer instructions, and a second cryptographic hash corresponding to a reference runtime utility;

receive an unverified set of computer instructions based on the first ledger entry, wherein:
the unverified set of computer instructions includes a robotic process automation (RPA) script generated based on data representing user actions, the RPA script being configured to automatically execute one or more processes, wherein the RPA script includes a neural network trained to predict at least one of the one or more processes to be executed based on contextual information, wherein the neural network is trained based on the data representing the user actions and contextual information related to the user actions;

compare a third cryptographic hash corresponding to the unverified set of computer instructions to the first cryptographic hash;

receive an unverified runtime utility based on the first ledger entry, wherein the unverified runtime utility is configured to execute the unverified set of computer instructions;

compare a fourth cryptographic hash corresponding to the unverified runtime utility to the second cryptographic hash;

determine that the third cryptographic hash corresponds to the first cryptographic hash and that the fourth cryptographic hash corresponds to the second cryptographic hash;

execute the unverified set of computer instructions using the unverified runtime utility;

generate a second ledger entry comprising the third cryptographic hash, the fourth cryptographic hash, a fifth cryptographic hash corresponding to a result of executing the unverified set of computer instructions, an indicator of success indicating whether the unverified set of computer instructions was successfully executed via the unverified runtime utility, and data comprising the unverified set of computer instructions; and add the second ledger entry to the blockchain ledger.

18. The system of claim 17, wherein the first ledger entry is the most recent ledger entry comprising an indicator of success.

19. The system of claim 17, wherein the reference set of computer instructions is received from the blockchain ledger.

20. The system of claim 17, wherein the reference runtime utility is received from the blockchain ledger.

21. The system of claim 17, wherein the blockchain ledger is configured to receive the first ledger entry from an authenticated node.

22. The system of claim 21, wherein the authenticated node is one of a plurality of authenticated nodes of a distributed network each configured to store a copy of at least some of the blockchain ledger.

23. A computer-enabled method for validating an execution of a set of computer instructions, comprising:
identifying a first ledger entry of a blockchain ledger, the first ledger entry comprising an indicator of success, a first cryptographic hash corresponding to a reference set of computer instructions, and a second cryptographic hash corresponding to a reference runtime utility;

receiving an unverified set of computer instructions based on the first ledger entry, wherein:
the unverified set of computer instructions includes a robotic process automation (RPA) script generated based on data representing user actions, the RPA script being configured to automatically execute one or more processes, wherein the RPA script includes a neural network trained to predict at least one of the one or more processes to be executed based on contextual information, wherein the neural network is trained based on the data representing the user actions and contextual information related to the user actions;

comparing a third cryptographic hash corresponding to the unverified set of computer instructions to the first cryptographic hash;

receiving an unverified runtime utility based on the first ledger entry, wherein the unverified runtime utility is configured to execute the unverified set of computer instructions;

comparing a fourth cryptographic hash corresponding to the unverified runtime utility to the second cryptographic hash;

determining that the third cryptographic hash corresponds to the first cryptographic hash and that the fourth cryptographic hash corresponds to the second cryptographic hash;

executing the unverified set of computer instructions using the unverified runtime utility;

generating a second ledger entry comprising the third cryptographic hash, the fourth cryptographic hash, a fifth cryptographic hash corresponding to a result of executing the unverified set of computer instructions, an indicator of success indicating whether the unverified set of computer instructions was successfully executed via the unverified runtime utility, and data comprising the unverified set of computer instructions; and adding the second ledger entry to the blockchain ledger.

24. The computer-enabled method of claim 23, wherein the first ledger entry is a most recent ledger entry comprising an indicator of success.

25. A non-transitory computer-readable storage medium storing one or more programs for validating an execution of a set of computer instructions, the one or more programs comprising instructions, which when executed by one or more processors of an electronic device, cause the one or more processors to execute a method comprising:
identifying a first ledger entry of a blockchain ledger, the first ledger entry comprising an indicator of success, a first cryptographic hash corresponding to a reference set of computer instructions, and a second cryptographic hash corresponding to a reference runtime utility;

receiving an unverified set of computer instructions based on the first ledger entry, wherein:
the unverified set of computer instructions includes a robotic process automation (RPA) script generated based on data representing user actions, the RPA script being configured to automatically execute one or more processes, wherein the RPA script includes a neural network trained to predict at least one of the one or more processes to be executed based on contextual information, wherein the neural network is trained based on the data representing the user actions and contextual information related to the user actions;

comparing a third cryptographic hash corresponding to the unverified set of computer instructions to the first cryptographic hash;

receiving an unverified runtime utility based on the first ledger entry, wherein the unverified runtime utility is configured to execute the unverified set of computer instructions;

comparing a fourth cryptographic hash corresponding to the unverified runtime utility to the second cryptographic hash;

determining that the third cryptographic hash corresponds to the first cryptographic hash and that the fourth cryptographic hash corresponds to the second cryptographic hash;

executing the unverified set of computer instructions using the unverified runtime utility;

generating a second ledger entry comprising the third cryptographic hash, the fourth cryptographic hash, a fifth cryptographic hash corresponding to a result of executing the unverified set of computer instructions, an indicator of success indicating whether the unverified set of computer instructions was successfully executed via the unverified runtime utility, and data comprising the unverified set of computer instructions; and adding the second ledger entry to the blockchain ledger.

26. The non-transitory computer-readable storage medium of claim 25, wherein the first ledger entry is a most recent ledger entry.

* * * * *